United States Patent [19]

Haghkar

[11] Patent Number: 5,044,770

[45] Date of Patent: Sep. 3, 1991

[54] THERMOMETER FOR HOT ASPHALTIC CONCRETE APPLICATION

[76] Inventor: Cyrus Haghkar, 610 Middleton Pla., Norristown, Pa. 19403

[21] Appl. No.: 500,583

[22] Filed: Mar. 28, 1990

[51] Int. Cl.$^5$ ............................................. G01K 01/14
[52] U.S. Cl. ...................................... 374/208; 242/96; 374/163
[58] Field of Search ....................... 374/208; 242/106; 206/308

[56] References Cited

U.S. PATENT DOCUMENTS

| | | | |
|---|---|---|---|
| 2,290,328 | 7/1942 | Hedfield et al. | 374/208 |
| 3,313,498 | 4/1967 | Wasson | 242/96 |
| 3,500,280 | 3/1970 | Ensign | 206/308 X |
| 3,677,866 | 7/1972 | Pickett et al. | 206/306 |
| 3,946,613 | 3/1976 | Silver | 374/208 X |
| 4,445,787 | 5/1984 | Parker | 374/208 X |
| 4,692,034 | 9/1987 | Fukui et al. | 374/208 |
| 4,741,627 | 5/1988 | Fukui et al. | 374/208 |
| 4,772,132 | 9/1988 | Hofmann | 374/208 |

FOREIGN PATENT DOCUMENTS 3413391 10/1985 Fed. Rep. of Germany ...... 374/208

Primary Examiner—Daniel M. Yasich
Attorney, Agent, or Firm—H. Jay Spiegel

[57] ABSTRACT

The present invention relates to an improved thermometer for hot asphaltic concrete application. The improved thermometer includes a housing holding a thermometer body and a temperature probe being connected to the thermometer body by a cable. The housing also includes means to store the temperature probe as well as retract the cable after it has been extended from the thermometer housing. The temperature probe may also include an extendable portion which permits measurement of temperatures at great depths in hot asphaltic concrete mixes.

6 Claims, 4 Drawing Sheets

THERMOMETER FOR HOT ASPHALTIC CONCRETE APPLICATION

BACKGROUND OF THE INVENTION

The present invention relates to an improved thermometer for hot asphaltic concrete application. In the prior art, thermometers for measuring the temperature of hot bituminous asphaltic concrete mixes are known. Additionally, electronic thermometers, as exemplified by U.S. Pat. No. 4,634,294 to Christol, et al. are known. U.S. Pat. No. 4,692,034 to Fukui, et al. discloses another example of an electronic thermometer which includes a probe connected to the thermometer body by a retractable cable.

With respect to measuring the temperature of hot asphaltic mixes, a need has developed for an improved and safer thermometer measuring device than those currently in use. With the prior art devices, a user may be burned while attempting to make a temperature measurement, the gauge may be lost because of an inadequate manner to carry or store the thermometer, or a user may be injured by a sharp steel pin which is a part of the prior art devices. As such, a need has developed to provide an improved thermometer for hot asphaltic concrete applications that overcomes the problems associated with prior art devices.

SUMMARY OF THE INVENTION

The present invention relates to an improved thermometer for hot asphaltic concrete applications. The present invention includes the following interrelated aspects and features:

(a) In the first aspect, the improved thermometer includes a main housing which contains the thermometer body itself. In the first embodiment, the thermometer may be a mechanical type having a dial to indicate a particular temperature. In an alternative embodiment, a digital type thermometer may be utilized which includes a digital display, a power supply and an on-off switch.

(b) The improved thermometer also includes a temperature sensing probe that is connected to the thermometer body by means of a cable. The thermometer probe may include an extendable portion which effectively doubles the length of the thermometer probe.

(c) The housing also includes a spool assembly which facilitates the storing of the cable which interconnects the thermometer probe and the thermometer body when the device is not in use. The spool assembly also includes a retractable handle that permits retraction of the cable after it has been extended.

(d) The housing also includes a probe holder portion for storing the thermometer probe when not in use. This portion includes an elongated slot containing clip means to secure the probe in the slot when not in use. The slot also includes an enlarged portion which permits a user of the device to grasp the temperature probe and remove it from the slot when required.

(e) The housing also includes a slotted opening which facilitates carrying of the device by a user. The slotted opening is adapted to engage the pin of a carrying device, the carrying device being adapted to be attached to the belt of a user.

Accordingly, it is a first object of the present invention to provide an improved thermometer for hot asphaltic concrete application.

It is a further object of the present invention to provide a thermometer including a sensing probe that is attached by cable to the thermometer and may be withdrawn from the thermometer device when required.

It is a yet further object of the present invention to provide a thermometer that includes a probe having an extendable portion therein to facilitate measuring temperatures at different depths in a hot asphaltic material.

It is a still yet further object of the present invention to provide an improved thermometer including a carrying case for a temperature probe so as to protect a user from the probe while carrying the thermometer device.

These and other objects, aspects and features of the present invention will be better understood from the following specific description of the detailed embodiments when read in conjunction with the appended drawing figures.

SPECIFIC DESCRIPTION OF THE PREFERRED EMBODIMENTS

Figure 1:
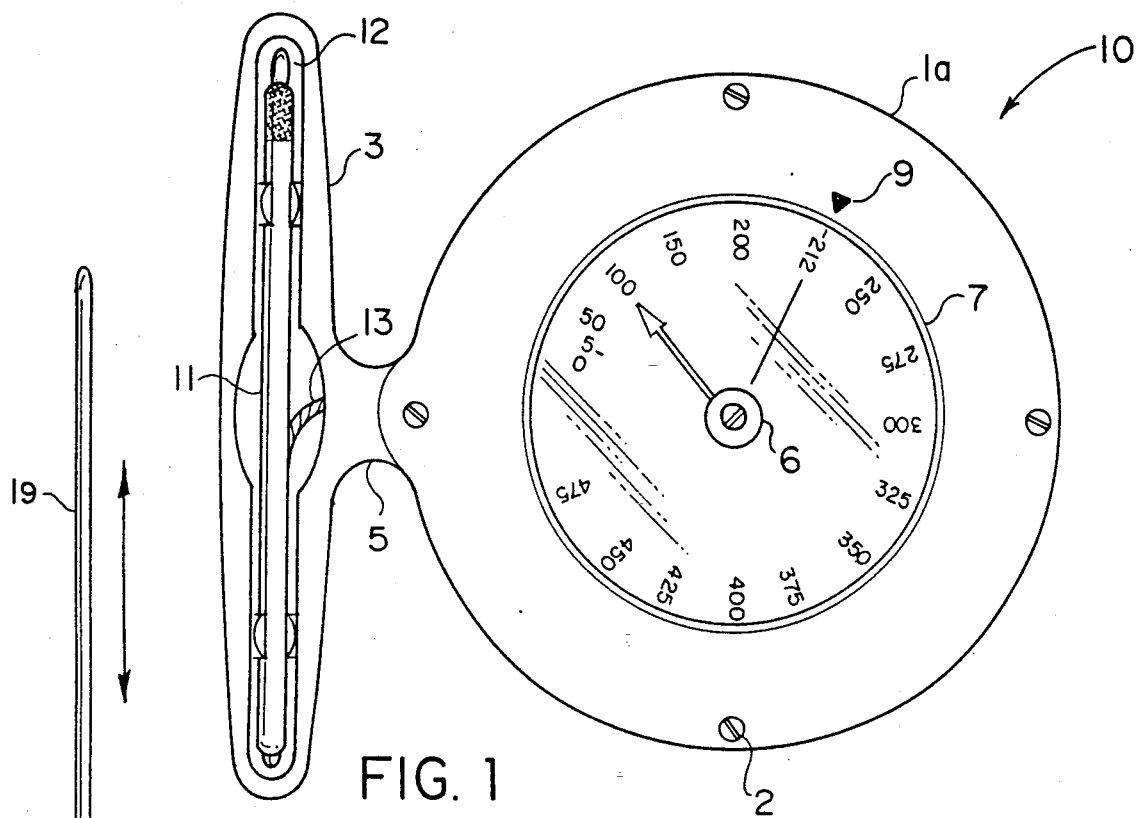
FIG. 1 shows a first embodiment of the improved thermometer of the present invention.

With reference, firstly, to FIG. 1, the improved thermometer for hot asphaltic concrete application is generally designated by the reference numeral 10 and is seen to include a housing portion 1a, a temperature probe carrying portion 3 joined to the housing portion 1a by a neck portion 5, and a thermometer body 7. The thermometer body 7 includes a calibration groove 6 and a calibration indicia 9 to permit the thermometer body to be calibrated to the temperature of boiling water. FIG. 1 also illustrates the temperature sensing probe 11 in the slot 12 of the probe carrying portion 3. Finally, the cable 13 is shown which connects the temperature probe 11 to the thermometer body 7.

Figure 2:
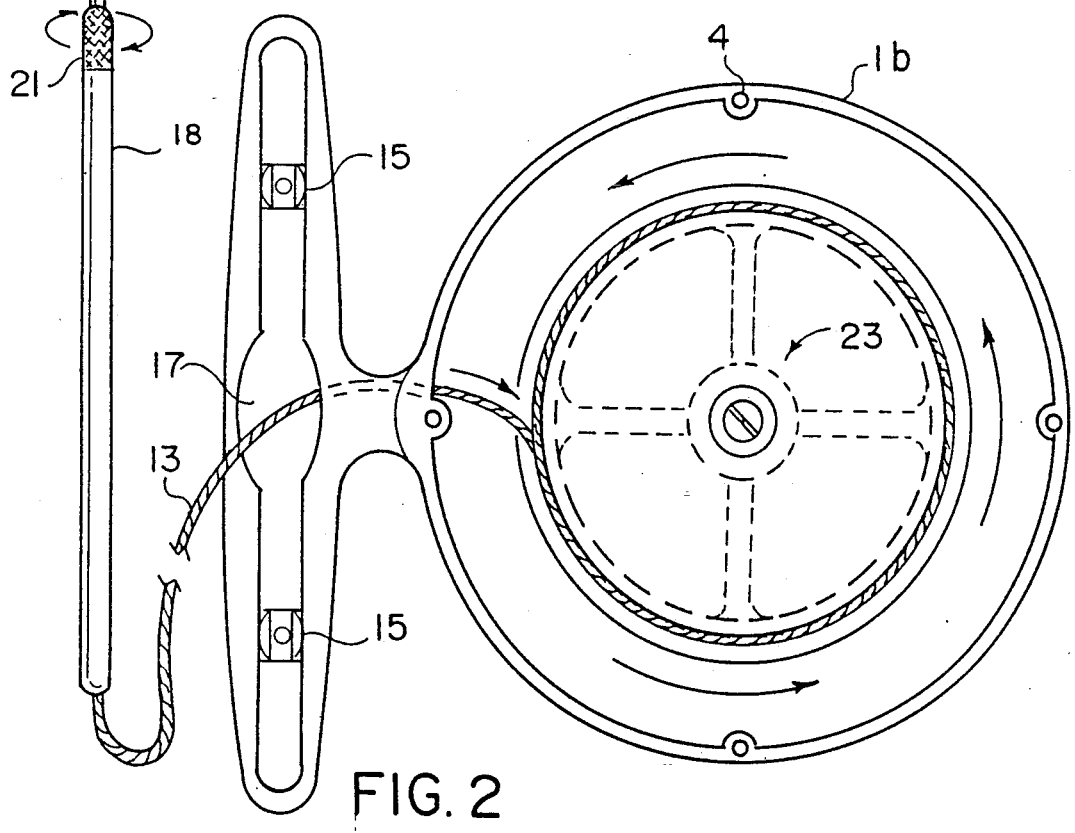
FIG. 2 shows the improved thermometer of FIG. 1 having the top half of the housing removed.

With reference to FIG. 2, the lower portion of the housing 1b is shown with the thermometer probe extended for use. As can be seen from this drawing, the lower housing portion 1b includes a plurality of recesses 4 to receive the fastening means 2 to secure the two housing halves together. The lower housing portion 1b also illustrates the reel means 23 which is adapted to store the cable 13 when the probe is not in use.

With reference to FIGS. 1 and 2, the temperature probe carrying portion 3 includes a pair of clip means 15 which are adapted to retain the probe 11 in the slot 12 when the thermometer is not being used. The probe carrying portion 3 also includes an enlarged portion 17 which facilitates removal of the temperature probe 11 by the user.

The temperature probe 11, as shown in FIG. 2, includes an extendable portion 19 which is adapted to extend or retract within the hollow probe portion 18. The extendable portion 19 may be locked in position by rotation of the locking screw 21. Of course, other locking devices may be utilized to secure the extendable probe portion 19 in a particular location. The cable 13 may be integrally connected to the extendable portion 19 by extending through the hollow probe portion 18 or the cable 13 may be connected to the extendable portion via the hollow probe portion 18 as shown in FIG. 2.

Figure 3:
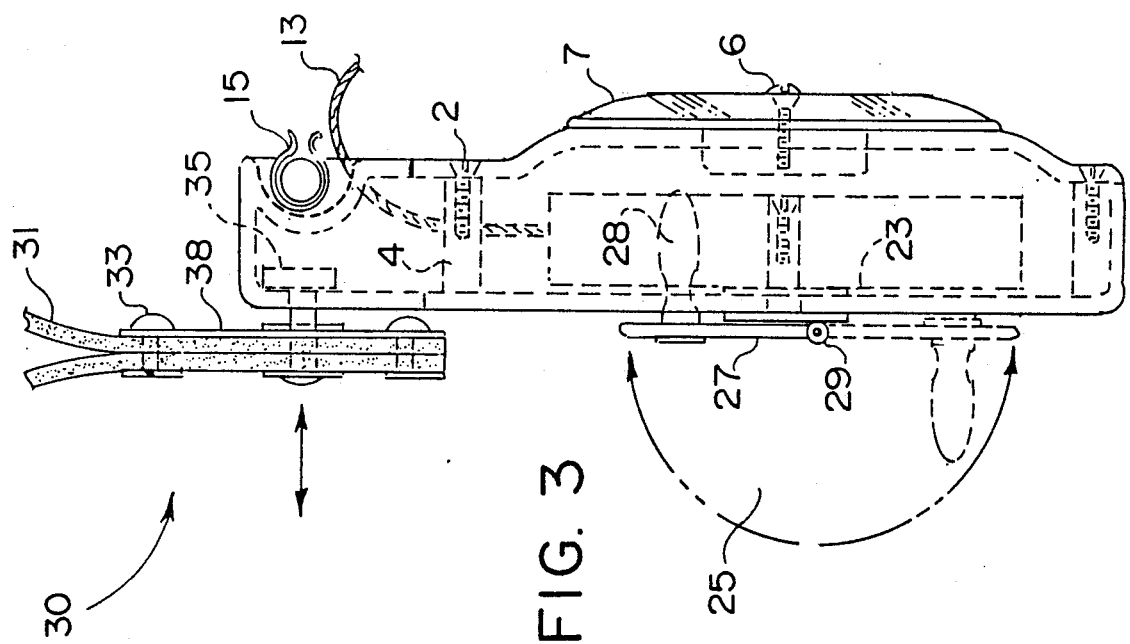
FIG. 3 shows a side view of the improved thermometer as shown in FIG. 1.

FIG. 3 shows a side view of the improved thermometer as shown in FIG. 1 showing in greater detail the means in which the cable may be retracted as well as how the device may be carried by a user. As can be seen from the drawing, the improved thermometer housing includes a winding cable assembly 25. The winding cable assembly 25 is seen to include a handle 28 connected to a plate 27, the plate 27 hinged at reference numeral 29. The winding cable assembly 25 may be pivoted at the reference numeral 29 such that the cable assembly may be withdrawn from the housing to faciliate rewinding the cable once it has been retracted. When not being used, the winding cable assembly 25 may be pivoted on the pivot hinge 29 to store the handle 28 within the housing.

Figure 4:
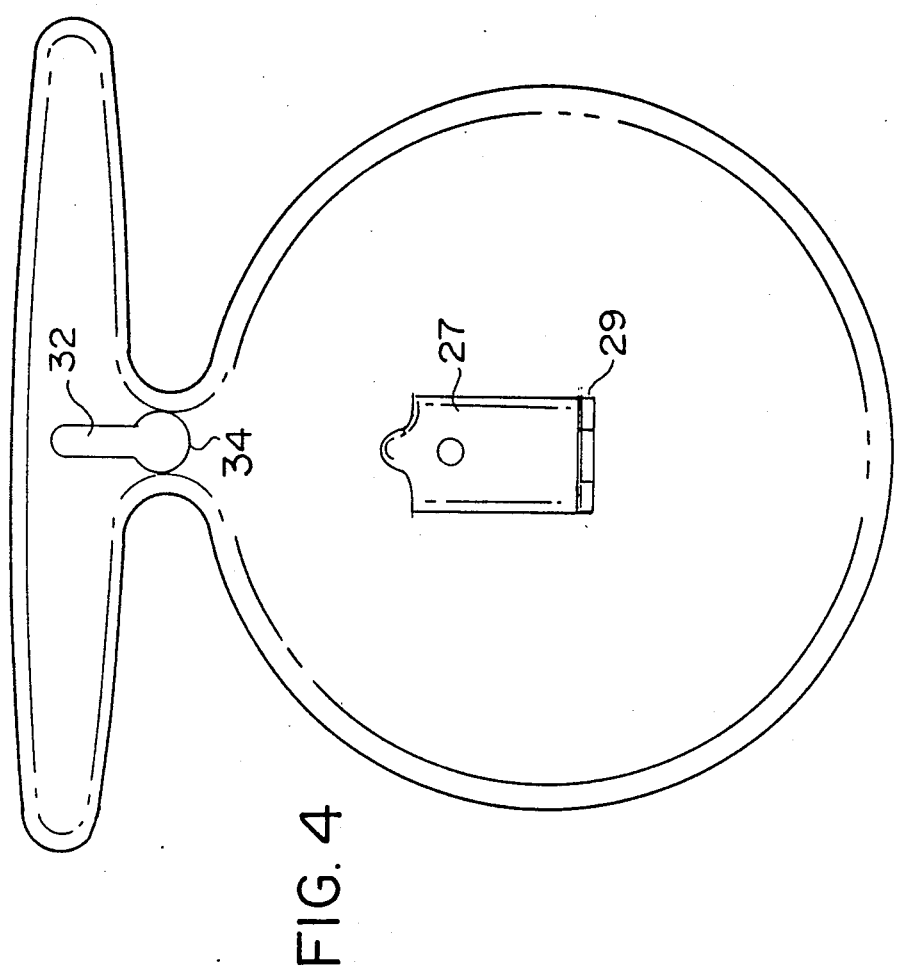
FIG. 4 shows a back view of the improved thermometer shown in FIG. 1.

With reference to FIGS. 3 and 4, a carrying device is generally designated by the reference numeral 30 and is seen to include a belt 31 which is attached together at one end thereof by a plate 38 and a plurality of rivets 33. Also included at the end of the belt 31 is a knob 35 which is adapted to support the improved thermometer when being carried on the carrying device 30. As can be seen from FIG. 4, the improved thermometer housing includes an opening having a slotted portion 32 and a circular portion 34. The knob 35 of the carrying device 30 is adapted to fit into the opening 34 and extends upward into the slot 32 such that the thermometer device is securely held when not in use. FIG. 4 also shows the plate 27 and the hinge 29 of the cable winding assembly 25 in the closed position.

Figure 5:
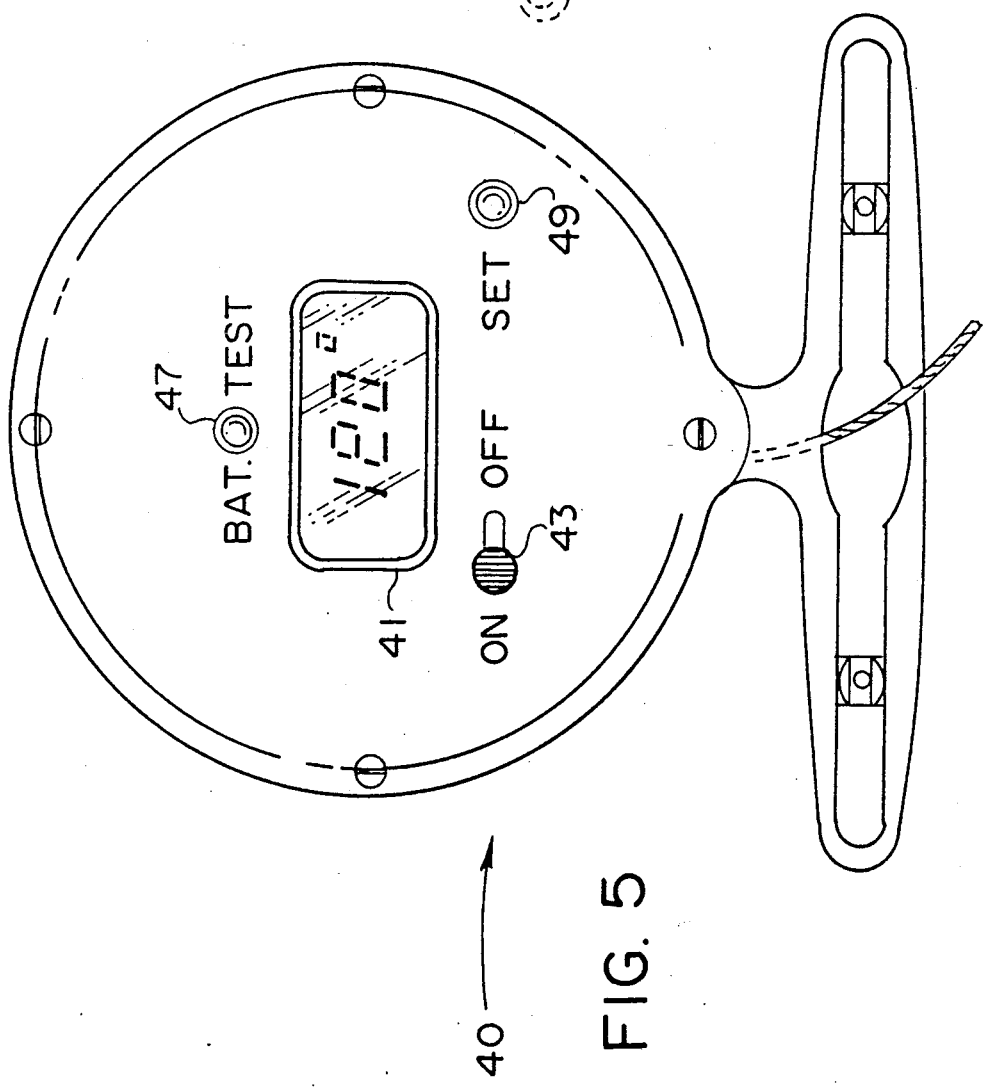
FIG. 5 shows a top view of a second embodiment of the improved thermometer.

With reference to FIG. 5, a second embodiment of the improved thermometer is generally designated by the reference numeral 40 and is seen to include an improved digital thermometer body. In particular, FIG. 5 depicts the digital thermometer display 41, an on-off switch 43, a battery test button 47, and a calibration set button 49.

Figure 6:
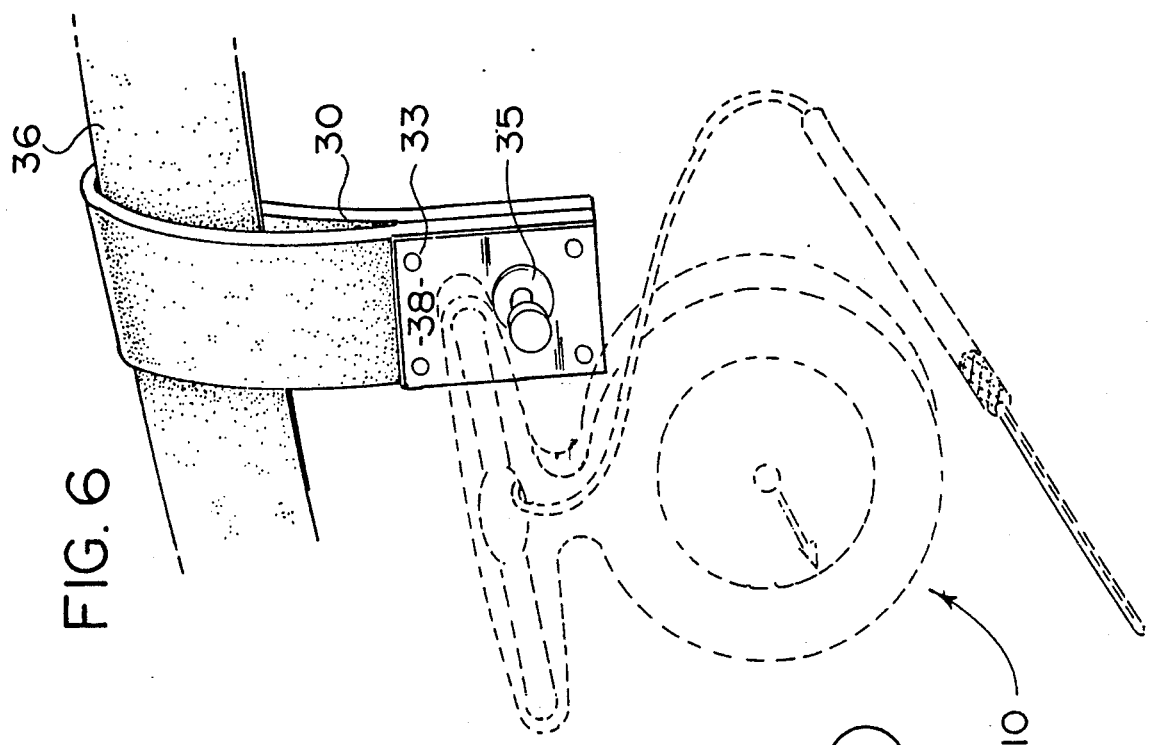
FIG. 6 shows a device used to carry the improved thermometer.

With reference to FIG. 6, a perspective view of the carrying device 30 is shown and more clearly illustrates how the carrying device interfaces between the thermometer and the user. In particular, the carrying device 30 is shown attached to a belt 36 with a phantom representation of the improved thermometer 10 shown detached from the carrying knob 35 of the carrying device 30.

Figure 7:
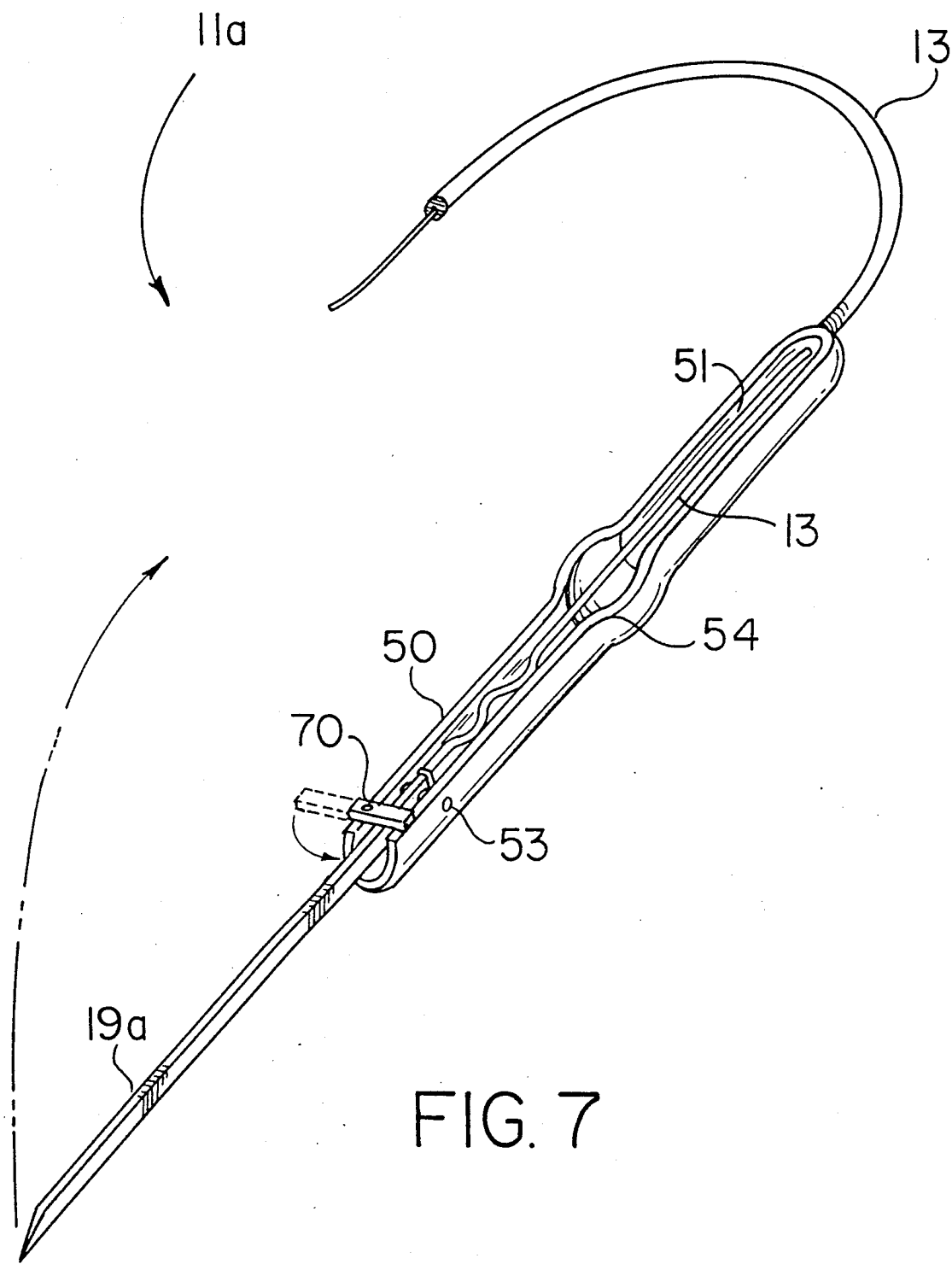
FIG. 7 shows a perspective view of a second embodiment of the temperature sensing probe.

With reference to FIG. 7, another embodiment of the temperature probe is illustrated in perspective and is generally designated by the reference numeral 11a. This probe includes a housing 50 having a slot 51 therein, the slot 51 being adapted to receive the extendable portion 19a when not in use. The extendable portion 19a pivots on the pin 53, the pin 53 extending through the housing 50. The slot 51 also includes an enlarged portion 54 therein to facilitate removing the extendable probe portion 19a from the slot. Additionally, locking device 70 pivotally connected to the housing 50 is shown locking the extendable portion 19a in place. Of course, other types of known locking devices may be used in place of the locking device 70. This embodiment provides advantages over other types of extendable temperature sensing probes in that the probe may be easily cleaned from hot sticky tar substances. Furthermore, the slot 51 permits cooling as well as expansion of the probe portion 19a after it has been heated during use. Additionally, the pivoting mechanism facilitates easy withdrawal of the probe, even when the probe is coated with tar or other substances.

It should be understood by one skilled in the art that any known mechanical or digital thermometers may be utilized in the present invention. Furthermore, the manner in which the temperature probe components such as the extendable portion as well as the hollow member, housing or connecting means are interconnected to transmit a sensed temperature via the cable 13 to the thermometer body are considered to be well known in the art and are not an aspect of the present invention. For example, the probes 19 or 19a may include a temperature sensitive element at the distal end thereof which is part of an electrical circuit including cable 13 that connects to the meter. A cable electrically connected to a temperature sensing probe and to an electrical display circuit is disclosed in the thermometer device in the patent to Fukui et al, No. 4,692,034.

The materials used in the present invention may be any known materials used conventionally in thermometers, either mechanical or digital. Preferably, the thermometer would be manufactured such that the total weight of the thermometer would be less than half a pound to facilitate carrying the thermometer as well as using it.

As such, an invention has been disclosed in terms of the preferred embodiments thereof which fulfills each and every one of the objects of the present invention as set forth hereinabove and provides a new and improved thermometer for hot asphaltic concrete application. Of course, many changes, modifications and alterations in the teachings of the present invention may be contemplated by those skilled in the art without departing from the spirit or scope thereof. As such, it is intended that the present invention only be limited by the terms of the appended claims.

I claim:

1. An improved thermometer for hot asphaltic concrete application comprising:
   (a) a housing, said housing having a first portion containing a thermometer body and a spool assembly for storing a cable and a second portion having a slot therein for removably storing a temperature sensing probe;
   (b) a temperature sensing probe, said temperature sensing probe further comprising a housing having a slot therein and an extendable sensing portion pivotally connected to an end portion of said housing, and whereby said extendable sensing portion may pivot between a retracted position within said housing when said thermometer is not in use and an extended position when said thermometer is being used to facilitate measuring temperatures of hot asphaltic concrete at increased depths; and
   (c) a cable connecting said thermometer body and said temperature sensing probe, said cable being adapted to transmit a sensed temperature from said temperature sensing probe to said thermometer body for indication of said sensed temperature;
   (d) whereby said spool assembly facilitates extension and retraction of said cable.

2. The invention of claim 1, wherein said thermometer body is a digital thermometer.

3. The invention of claim 1, wherein said thermometer body is a mechanical type thermometer.

4. The invention of claim 1, wherein said housing includes a slotted opening for removably attaching said improved thermometer to a carrying device.

5. The invention of claim 4, further comprising a carrying device removably attachable to a user of said improved thermometer, said carrying device including a knob for insertion into said slotted opening of said housing.

6. The invention of claim 1, wherein said portion of said housing further includes clip means to secure said temperature sensing probe in said slot.

* * * * *